Sept. 24, 1968 J. G. LEIMBACH 3,402,566

REGULATING VALVE FOR REFRIGERATION SYSTEMS

Filed April 4, 1966

INVENTOR.
JOHN GEORGE LEIMBACH

BY Cohn and Powell

ATTORNEYS.

United States Patent Office 3,402,566
Patented Sept. 24, 1968

3,402,566
REGULATING VALVE FOR REFRIGERATION SYSTEMS
John George Leimbach, Crestwood, Mo., assignor to Sporlan Valve Company, St. Louis, Mo., a corporation of Missouri
Filed Apr. 4, 1966, Ser. No. 539,842
2 Claims. (Cl. 62—197)

ABSTRACT OF THE DISCLOSURE

A regulating valve for a refrigeration system interconnecting the condenser inlet and evaporator inlet including a flexible motor element subjected to one side to a predetermined pressure and subjected on the other side to the pressure at the evaporator so as to maintain a minimum evaporator pressure regardless of variations of refrigerating load.

---

This invention relates generally to improvements in a regulating valve for refrigeration systems, and more particularly to improvements in a valve of this type adapted to maintain a constant evaporator pressure or to maintain a minimum suction pressure.

An important objective is to provide a regulating valve that can be utilized as an expansion valve in a refrigeration system to maintain a constant evaporator pressure, or can be utilized as a discharge bypass valve to bypass high pressure gas from the condenser into the low pressure side of the system to maintain a minimum suction pressure. This latter usage will reduce the capacity of the plant during light load and will prevent freezing of water on the evaporator.

Another important objective is achieved by the provision of a valve means in the regulating valve for the refrigerating system which includes opposed first and second pressure surfaces, the first pressure surface being subjected to the pressure in the valve passage at one side of the valve port tending to move the valve means in one direction, and by the provision of means subjecting the second pressure surface of the valve means to the same pressure in the valve passage tending to move the valve means in the opposite direction, the valve means being movable toward or away from the valve seat to control flow through the valve port. A flexible motor element carried by the body is operatively connected to the valve means for moving the valve means. The regulating valve includes means subjecting one side of the motor element to a predetermined pressure, and includes means subjecting the other side of the motor element to a pressure in the system which is to be regulated.

Yet another important objective is afforded by the provision of a chamber in the valve body, and by the construction of the valve means to include a piston reciprocatively mounted in the chamber, and to include a member connected to and movable with the piston, the member being movable toward or away from the valve seat to control flow through the valve port. The member includes the first pressure surface defined by the valve port, while the piston includes the opposed second pressure surface partially defining the chamber. The chamber communicates with the valve passage at one side of the valve port so that the same pressure exerted on the first pressure surface is exerted on the second pressure surface and tends to move the valve member in the opposite direction.

An important objective is realized by the provision of a vent hole in the member at one end of the piston which places the chamber in communication with the valve passage at one side of the valve port through the valve port to subject the second pressure surface to the same pressure that is exerted on the first pressure surface.

Another important objective is attained by constructing the valve so that the area of the second pressure surface is substantially equal to the area of the valve port to neutralize the effect of unbalanced pressure across the valve port and eliminate any effect of variation of pressure at the valve inlet on the pressure at the valve outlet.

Still another important objective is provided by making the area of the second pressure surface larger than the area of the valve port to create a pressure differential tending to move the valve means in a closing direction upon an increase in pressure at the valve inlet to achieve a substantially constant pressure at the valve outlet at constant load regardless of variations in pressure at the valve inlet.

An important objective is achieved by the provision of a refrigeration system in which the inlet of the regulating valve is connected to the high pressure side of the system while the outlet is connected to a line leading to the evaporator. The valve means includes a first pressure surface that is defined by the valve port and subjected to the pressure in the valve passage at one side of the valve port tending to move the valve means toward and open position, and includes a second pressure surface subjected to the same pressure exerted on the first pressure surface and tending to urge the valve means toward a closed position. One side of the flexible motor element is subjected to a predetermined pressure while the other side is subjected to a pressure in the low pressure side of the system which is to be regulated.

Another important objective is afforded by the structural arrangement in the refrigeration system in which the means subjecting the one side of the motor element to the predetermined pressure tends to move the valve means to an open position, while the means subjecting the other side of the motor element to the pressure which is to be regulated tends to move the valve means to a closed position. By proportioning the area of the second pressure surface to the area of the valve port, the regulated pressure is maintained substantially constant regardless of variations in pressure at the valve inlet.

A further important objective is realized by connecting the valve inlet to a line leading from the condenser and by connecting the means, interconnecting the said other side of the motor element and the system, to the system at the evaporator so that the evaporator pressure is maintained substantially constant regardless of variations in pressure at the valve inlet.

An important objective is attained by the provision of a refrigeration system in which an expansion means is connected in the system between the condenser and evaporator, and by the connection of the valve inlet to the condenser inlet while the valve outlet is connected to the evaporator inlet on the low pressure side of the expansion means, whereby to bypass high pressure gas from the condenser into the low pressure side. The means interconnecting the said other side of the motor element and the system is connected to the system at the evaporator so as to maintain a minimum evaporator pressure regardless of variations of refrigerating load.

Another important objective is provided by proportioning the areas of the first and second pressure surfaces in the refrigeration system so that the area of the first pressure surface is equal to the area of the valve port, whereby the regulated pressure is maintained substantially constant regardless of the variations in pressure at the valve inlet by neutralizing the effect of unbalanced pressure across the valve port. The area of the first pressure surface can be made larger than, and proportioned to the area of the valve port so that the regulated pressure is maintained substantially constant at a constant refrigeration load regardless of variations in pressure at the valve inlet.

It is an important objective to provide a regulating valve for a refrigeration system that is simple and durable in construction, economical to manufacture and assemble, highly efficient in operation, and which operates automatically in a suitable refrigeration system to maintain a constant evaporator pressure or to maintain a minimum suction pressure.

The foregoing and numerous other objects and advantages of the invention will more clearly appear from the following detailed description of a preferred embodiment, particularly when considered in connection with the accompanying drawing, in which.

Figure 1:
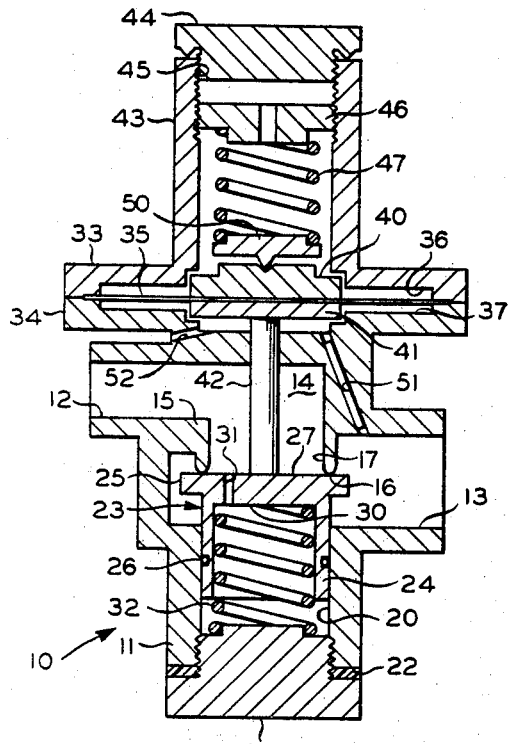
FIG. 1 is a cross-sectional view of a regulating valve.

Referring now by characters of reference to the drawing, and first to the embodiment of the regulating valve generally indicated by 10 and illustrated by FIG. 1, it will be understood that this regulating valve 10 includes a valve body 11 having a valve inlet 12 and a valve outlet 13 interconnected by a refrigerant passage 14. Formed internally of valve body 11 is a partition 15 through which the passage 14 extends. The partition 15 includes a valve seat 16 defining a valve port 17.

Formed in the valve body 11 is a substantially cylindrical chamber 20 at one side of the valve port 17. The chamber 20 is closed at one end by a cap 21 threadedly connected to the valve body 11. A gasket 22 between the cap 21 and valve body 11 provides a seal.

Reciprocatively mounted within the valve body 11 is a valve means generally referred to by 23 that is movable toward or away from the valve seat 16 to regulate flow through the valve port 17. Specifically, the valve means 23 includes a piston 24 slidably mounted within the cylindrical chamber 20, and includes a member 25 integral with the piston 24 at one end adapted to coact with the valve seat 16 to control flow of the refrigerant through the valve port 17. An O-ring 26 is carried by the piston 24 and sealingly engages the cylindrical wall of body 11 defining the cylindrical chamber 20.

The valve means 23 is provided with opposed first and second pressure surfaces 27 and 30 respectively. More particularly, the first pressure surface 27 is provided by the valve member 25 and is defined by the valve seat 16, and hence by the valve port 17. The first pressure surface 27 is subjected to the pressure existing in the valve passage 14 at the valve inlet 12 and exerted through the valve port 17, the inlet pressure being exerted on the first pressure surface 27 tending to urge the valve means 23 toward an open position. The second pressure surface 30 is provided by one side of piston 24 and is defined by the diameter of the valve body 11 engaged by the O-ring 26. This second pressure surface 30 partially defines the chamber 20. The valve member 25 is provided with a vent hole 31 that places the chamber 20 in communication with the valve pasage 14 through the valve port 17, and consequently, transmits the inlet pressure to the chamber 20 and hence subjects the second pressure surface 30 to the same pressure as is exerted on the first pressure surface 27. This opposing pressure exerted on the second pressure surface 30 tends to urge the valve means 23 toward a closed position.

Located within the chamber 20 is a compression spring 32, one end of which engages the valve means 23, while the other end seats on the cap 21. The compression spring 32 exerts a predetermined force on the valve means 23, tending to move the valve means 23 toward a closed position.

Attached to the valve body 11 are a pair of housing plates 33 and 34 that are spaced to provide a pressure chamber therebetween. A flexible diaphragm 35, constituting a flexible motor element, is fixed between the peripheral margins of plates 33 and 34 and extends across the pressure chamber to divide the chamber into separate compartments 36 and 37. A bellows can be utilized in lieu of diaphragm 35, if desired.

Located in the compartment 36 and fixed to one side of diaphragm 35 is a buffer plate 40. Another buffer plate 41 is located in the compartment 37 and is fixed to the opposite side of diaphragm 35. A push rod 42 is slidably received and mounted in the valve body 11. One end of the push rod 42 engages the buffer plate 41, while the opposite end engages the valve member 25, the push rod 42 extending through the valve port 17.

A tubular body 43 is formed integrally with the housing plate 33. A cap 44 threadedly attached to the upper end of tubular body 43 provides a seal. Located within the tubular body 43 and threadedly connected to internal threads 45 is an adjusting screw 46. A compression spring 47 is located within the tubular body 43, one end of which engages the adjusting screw 46, while the other end seats on a spring holder 50 engaging the buffer plate 40. The force exerted by the compression spring 47 and the atmospheric pressure existing in the tubular body 43 and in compartment 36 are both substantially constant, and are exerted on one side of the diaphragm 35 tending to urge the valve means 23, through the push rod 42, toward an open position.

Formed in the valve body 11 is an internal equalizer passage 51 interconnecting the valve outlet 13 with the compartment 37, thereby subjecting the other side of diaphragm 35 to valve outlet pressure or to evaporator pressure when connected into a refrigeration system.

An external equalizer passage 52 is formed in the valve body 11 and communicates with the compartment 37 also. An external line (later described) connects the passage 52 to the evaporator outlet or to the low pressure side of the system in order to subject the underside of diaphragm 35 to the pressure which is to be regulated. It will be apparent that when in use in a refrigeration system, either the internal equalizer passage 51 or the external equalizer passage 52 will be utilized. For the sake of clarity, in FIG. 1, the external equalizer passage 52 is open while the internal equalizer passage 51 is plugged. Of course, if desired, the external equalizer passage 52 can be plugged while the internal equalizer passage 51 can be maintained open for use. The regulated pressure exerted on the underside of diaphragm 35 tends to allow the valve means 23 to move toward the closed position.

For the purpose of explaining the functional advantages and purpose of the regulating valve 10, it will be assumed that the vent hole 31 is omitted and that the O-ring 26 is eliminated so that the valve means 23 can reciprocate freely. In addition, it will be assumed that the external equalizer passage 52 is plugged and that the internal equalizer passage 51 is open so as to subject the underside of diaphragm 35 to the pressure of the refrigerant at the outlet 13 of the valve. It will be understood that this pressure would be conveyed to the diaphragm 35 by a passage from the evaporator inlet or from some other point in the low pressure side of the system. The inlet or high side pressure presses against the valve means on one side and the suction pressure presses against the valve means in the opposite direction. The difference of these two pressures on the valve means 23 is called the unbalanced pressure across the valve.

The amount of valve opening required to provide the desired refrigerant flow and variation in inlet pressure are factors which tend to vary the valve outlet pressure from the pre-set value. The first mentioned factor is not serious and is minimized by the use of a spring 47 having a low gradient or by the use of a constant gas pressure in place of the compression spring 47. The second factor, i.e., the variation in inlet pressure, is serious and its adverse effect is substantially prevented by the present improvements.

For example, in the valve 10 in which the pressure across the valve member 25 is not balanced, if the effective area of the diaphragm 35 is 2 square inches, the area of the valve port 17 is ½ square inch, the setting of the regulating spring 47 minus the force of the counterbalancing spring 32 is 100 lbs., and the inlet pressure is 200 lbs. per square inch, the resulting outlet pressure will be 80 lbs. per square inch. This outlet pressure of 80 lbs. per square inch will not be constant if the inlet pressure varies, say from 200 lbs. per square inch to 300 lbs. per square inch. On the contrary, it will change from 80 lbs. to 100 lbs. per square inch. This undesirable variation is caused by the variation in unbalanced pressure across the valve port 17.

With the vent hole 31 in the valve means 23 of the regulating valve 10, the inlet pressure is conveyed into the chamber 20. To completely neutralize the effect of unbalanced pressure across the port, the area of the second pressure surface 30 is made the same as the area of the valve port 17. Consequently, the pressure difference across the valve member 25 is counterbalanced by an equal pressure in the opposite direction because inlet pressure exists on both sides of the valve member 25. Any variations in this pressure will have no effect on the valve position or opening and little effect on the outlet pressure. Of course, a different loading for the compression spring 47 must be applied to make up for the loss of the unbalanced pressure that would otherwise be exerted on the valve means 23 tending to move the valve means 23 toward an open position in order to achieve the same outlet pressure as described previously with respect to a valve in which the vent hole 31 was not provided.

The flow through the regulating valve 10 may be reversed, and still, the unbalanced pressure effect is eliminated. Under these circumstances, instead of inlet pressure being exerted on both the first and second pressure surfaces 27 and 30, the outlet pressure will be exerted in opposing directions on such pressure surfaces 27 and 30. Again, the pressure of the compression spring 47 will have to be changed to maintain the same outlet pressure as existed without the balanced port.

Variation in inlet pressure has a second and somewhat smaller effect on the outlet pressure, in addition to the serious variation previously described. This second effect results from the fact that, for a constant flow through the regulating valve 10, a certain valve opening and a certain pressure drop across the valve port 17 must exist. If the pressure drop across the valve port 17 varies because of a variation in inlet pressure, a variation in valve opening must be made or the outlet pressure will change. For example, if the inlet pressure drops, a greater valve opening is necessary, and if the inlet pressure increases, a lesser valve opening is required, for constant outlet pressure and at constant load.

To compensate for these changes in inlet pressure, the regulating valve 10 can be used. However, instead of making the area of the second pressure surface 30 equal to that of the valve port 17, the second pressure surface 30 is made larger than the valve port 17. Instead of balancing out the effect of inlet pressure, a differential pressure is set up which tends to move the valve means 23 toward a closed position upon an increase in inlet pressure and toward an open position upon a decrease in inlet pressure.

As an example, assume that the regulating valve 10 as shown in FIG. 1 is in a fully open position and passing the proper flow with an inlet pressure of 200 lbs. per square inch and an outlet pressure of 80 lbs. per square inch. Suppose the net opening pressure of the two springs 47 and 32 is 190 lbs., the effective diaphragm area is 2 square inches, the area of the valve port 17 is ½ square inch, and the area of the second pressure surface 30 is 0.65 square inch. If the inlet pressure raised, because of some external cause, to 300 lbs. per square inch, then too much fluid would flow through the valve 10 to supply the same load. The forces affecting the valve position at 200 lbs. per square inch inlet pressure would be 100 lbs.+190 lbs.=290 lbs. in the opening direction; 160 lbs.+130 lbs.=290 lbs. in the closing direction. At this balance point, the valve means 23 is in the open position.

When the inlet pressure increases to 300 lbs. per square inch, the forces affecting the valve position are 150 lbs.+190 lbs.=340 lbs.

in the opening direction, and 160 lbs.+195 lbs.=355 lbs.

in the closing direction. This excess of 15 lbs. pressure in the closing direction will cause the valve means 23 to partly close, striking a new balance with the then increased spring pressure. This new position of valve means 23 will substantially prevent an increase in outlet pressure which otherwise would have resulted. By properly proportioning the area of the second pressure surface 30 to that of the valve port 17, a substantially constant outlet pressure can be achieved at constant load regardless of variations in inlet pressure.

Figure 2:
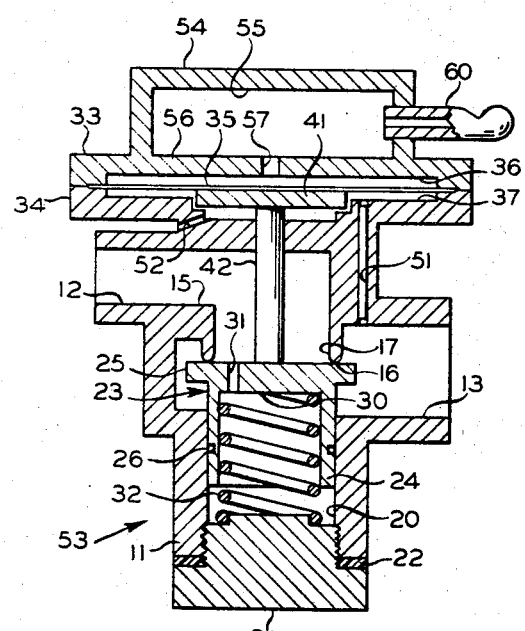
FIG. 2 is a cross-sectional view of a modified regulating valve.

The modified regulating valve generally indicated by 53 in FIG. 2 has the same general construction as the regulating valve 10 in FIG. 1 except that the adjusting spring 47 (FIG. 1) has been eliminated and in its place a charge of air or any superheated gas has been substituted. For the sake of clarity, the component parts of the regulating valve 53 corresponding to identical or similar parts of the valve 10 are given the corresponding reference numerals. The regulating valve 53 is provided with a housing 54 formed integrally with the plate 33 to provide a charge chamber 55. A partition 56 divides the charge chamber 55 from the pressure compartment 36. An aperture 57 formed in the partition 56 places the charge chamber 55 in communication with the compartment 36 and subjects the upper side of the diaphragm 35 to the pressure of such charge. Communicating with the charge chamber 55 and attached to the housing 54 is a tube 60 that is pinched and sealed after the introduction of the appropriate charge to maintain the charge pressure in chamber 55.

A diaphragm 35 or bellows which is loaded or balanced by means of air or superheated gas pressure operates with a small differential pressure across its two sides. This results in greater effective diaphragm area, increased diaphragm or bellows life and the elimination of the gradient of the spring 47. By proper proportioning of the volume of the air charge, a much smaller gradient than that of the spring 47 is substituted.

Generally, an air-loaded diaphragm 35, utilized in the regulating valve 53, is used where the pressure setting is made at the factory and where field setting is not necessary. The spring-loaded diaphragm 35, utilized in the regulating valve 10, being readily adjustable, is generally used where adjustment of outlet pressure must be made on the job.

The regulating valves 10 and 53 are generally rated by their ability to pass a certain amount of fluid during a specified reduction in outlet pressure. For instance, if a valve closed at an outlet pressure of 50 lbs. per square inch, but is just on the point of opening, and then the outlet pressure is reduced externally to 42 lbs. per square inch, the resulting flow would be its rating. The other factors being equal, the flow of the valve 53 with the air-loaded diaphragm 35 would exceed that of the valve 10 with the spring-loaded diaphragm 35.

Figure 3:
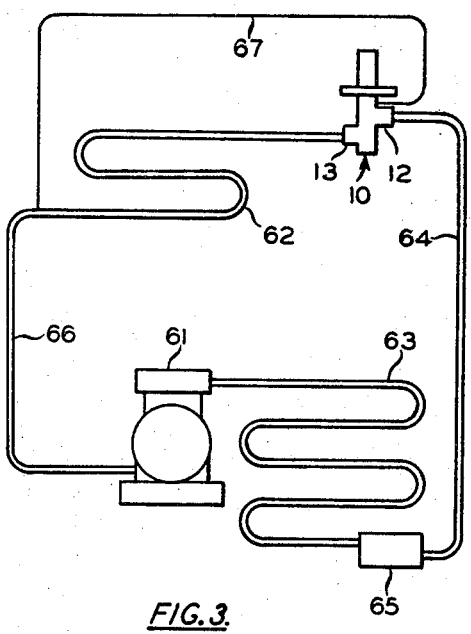
FIG. 3 is a diagram showing a refrigeration system and the connection of the regulating valve as an expansion valve in such system.

FIG. 3 illustrates a refrigeration system in which either valve 10 or 53 could be used. For the purpose of explanation, the regulating valve 10 is shown, but it will be understood that the valve 53 could be used and the operation of the system would be the same.

The refrigeration system of FIG. 3 includes a compressor-motor unit 61, an evaporator 62, and a condenser 63. The regulating valve 10 is used as an expansion valve in this system and is connected in the refrigerant line between the evaporator 62 and the condenser 63. More particularly, the valve inlet 12 is connected to the liquid line 64 leading from the condenser 63 and receiver 65. The valve outlet 13 is connected to the inlet of the evaporator 62. Of course, the evaporator 62 is connected by the suction line 66 to the compressor-motor unit 61. A connection, termed an external equalizer 67, connects the evaporator outlet to the diaphragm compartment 37 through the external equalizer passage 52. In this particular system, it is desired to control the pressure at the evaporator outlet instead of the inlet. When this external equalizer connection 67 is made, the internal equalizer passage 51 inside the valve body 11, is plugged. Conversely, if it is desired to control the pressure at the evaporator inlet, which conforms to the valve outlet 13, then the internal equalizer passage 51 is used and the external equalizer passage 52 is plugged.

In this system, as explained previously, upon a variation in the pressure at the valve inlet 12 on the high pressure side of the system, the evaporator pressure will remain substantially constant. In utilizing a valve 10 in which the area of the second pressure surface 30 is equal to the area of the valve port 17, the effect of the inlet pressure will be neutralized in that there will be equal and opposing forces exerted on the valve means 23 by such inlet pressure. Variations in the inlet pressure will have no effect on the pre-set outlet pressure and consequently, the evaporator pressure will be maintained constant. This valve arrangement will eliminate the most serious problems presented by variation in inlet pressure and its effect on the outlet pressure, and specifically on the evaporator pressure.

By utilizing a valve 10 in which the area of the second pressure surface 30 is larger than the valve port 17 and proportioned thereto, a predetermined differential pressure can be set up which tends to move the valve means 23 in a closing direction upon an inlet pressure increase and in an opening direction upon an inlet pressure decrease, whereby a constant evaporator or outlet pressure will be maintained at a constant load.

Figure 4:
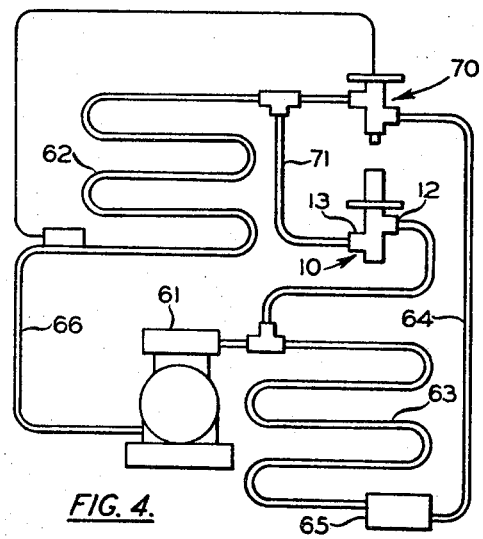
FIG. 4 is a diagram showing another refrigeration system and the connection of the regulating valve as a discharge bypass valve in such system.

FIG. 4 illustrates a refrigeration system in which either regulating valve 10 or 53 can be utilized as a discharge bypass valve. For the purpose of explanation, the regulating valve 10 is shown, but it will be understood that the valve 53 can be utilized if desired to obtain the same advantageous results. The component parts of the refrigeration system illustrated in FIG. 4 corresponding to the parts shown by the system in FIG. 3 are given corresponding reference numerals where possible.

In this refrigeration system (FIG. 4), a thermostatic expansion valve generally indicated by 70 or any other expansion device is located in the line 64 between the evaporator 62 and the condenser 63. This thermostatic expansion valve 70 is conventional and is of a general type disclosed in U.S. Patents No. 2,924,079 and No. 2,960,845, for example, sold by Sporlan Valve Company of St. Louis, Mo.

The regulating valve 10 is connected in a bypass line 71 operatively interconnecting the high pressure side of the system to the low pressure side. Specifically, the regulating valve 10 has its inlet 12 connected to the inlet of condenser 63, and has its valve outlet 13 connected to the inlet of evaporator 62 or to the outlet of the expansion valve 70.

In this system, liquid refrigerant is fed into the evaporator 62 by the thermostatic expansion valve 70. The evaporator pressure is determined by a balance of several factors including the refrigerating load. If this load drops below a certain point, then the evaporator pressure will fall below a desirable minimum. When this occurs, the regulating valve 10 will open and hold the evaporator pressure to a predetermined minimum value.

When the area of the second pressure surface 30 of the regulating valve 10 is made equal to the area of the valve port 17, the valve inlet pressure exerted on the opposed first and second pressure surfaces 27 and 30 will be neutralized so that the valve means 23 will be actuated in response to variation in the valve outlet pressure or the evaporator inlet pressure which is conveyed through the internal equalizer passage 51 to the underside of diaphragm 35. Therefore, the effect of inlet pressure is eliminated and any variation in the inlet pressure will have no effect on the pre-set outlet pressure.

Of course, as explained previously, the area of the second pressure surface 30 can be made larger than, and proportioned relative to, the area of the valve port so as to set up a pressure differential on the valve means 23 under valve inlet pressure that tends to move the valve means 23 in a closing direction upon an increase in inlet pressure and in an opening direction upon a decrease in inlet pressure. Therefore, a substantially constant, minimum evaporator pressure will be achieved at a constant load regardless of variations in inlet presure.

Of course, the regulating valve 53 operates substantially in the same manner in the bypass line 71 to maintain a minimum evaporator pressure. Either one of these regulating valves 10 or 53 will open when the evaporator pressure reaches a minimum setting and will feed high pressure refrigerant vapor from the condenser inlet into the evaporator inlet, bypassing the condenser 63 and expansion valve 70, and thereby will hold the evaporator pressure at the predetermined minimum value.

Although the invention has been described by making detailed reference to several preferred embodiments, such detail is to be understood in an instructive, rather than in any restrictive sense, any variations being possible within the scope of the claims hereunto appended.

I claim as my invention:

1. In a refrigeration system having a compressor, and evaporator operatively interconnected:
    (a) a regulating valve comprising a body having an inlet and an outlet interconnected by a passage for flow therethrough, the outlet being connected to a line leading to the evaporator, and the inlet being connected to the high pressure side of the system,
    (b) a valve seat defining a valve port in the passage,
    (c) a valve means movably mounted in the body for movement toward or away from the valve seat to control flow through the valve port,
    (d) a spring means tending to urge the valve means toward a closed position,
    (e) the valve means including opposed first and second pressure surfaces, the first pressure surface being defined by the valve port and subjected to the pressure in the valve passage at one side of the valve port tending to move the valve means toward an open position,
    (f) means subjecting the second pressure surface to the same pressure exerted on the first pressure surface and tending to urge the valve means toward a closed position,
    (g) a flexible motor element carried by the body and operatively connected to the valve means for moving the valve means,
    (h) means subjecting one side of the motor element to a predetermined pressure,
    (i) means subjecting the other side of the motor element to a pressure in the low pressure side of the system which is to be regulated,
    (j) the means subjecting the one side of the motor element to the predetermined pressure tending to move the valve means to an open position,
    (k) the means subjecting the other side of the motor element to the pressure which is to be regulated tending to move the valve means to a closed position, (l) the area of the second pressure surface being proportioned to the area of the valve port so that the said regulated pressure is maintained substantially constant regardless of variations in pressure at the valve inlet, (m) an expansion means connected in the system between the condenser and evaporator, (n) the valve inlet being connected at the condenser inlet, (o) the valve outlet being connected at the evaporator inlet on the low pressure side of the expansion means to bypass high pressure gas from the condenser into the low pressure side, and (p) the means interconnecting the said other side of the motor element and the system being connected to the system at the evaporator so as to maintain a minimum evaporator pressure regardless of variations of refrigerating load.

2. In a refrigeration system having a compressor, condenser, and evaporator operatively interconnected:

(a) a regulating valve comprising a body having an inlet and an outlet interconnected by a passage for flow therethrough, the outlet being connected to a line leading to the evaporator, and the inlet being connected to the high pressure side of the system, (b) a valve seat defining a valve port in the passage, (c) a valve means movably mounted in the body for movement toward or away from the valve seat to control flow through the valve port, (d) a spring means tending to urge the valve means toward a closed position, (e) the valve means including opposed first and second pressure surfaces, the first pressure surface being defined by the valve port and subjected to the pressure in the valve passage at one side of the valve port tending to move the valve means toward an open position, (f) means subjecting the second pressure surface to the same pressure exerted on the first pressure surface and tending to urge the valve means toward a closed position, (g) a flexible motor element carried by the body and operatively connected to the valve means for moving the valve means, (h) means subjecting one side of the motor element to a predetermined pressure, (i) means subjecting the other side of the motor element to a pressure in the low pressure side of the system which is to be regulated, (j) the means subjecting the one side of the motor element to the predetermined pressure tending to move the valve means to an open position, (k) the means subjecting the other side of the motor element to the pressure which is to be regulated tending to move the valve means to a closed position (l) the area of the second pressure surface being proportioned to the area of the valve port so that the said regulated pressure is maintained substantially constant regardless of variations in pressure at the valve inlet, (m) the body includes a chamber at the other side of the valve port, (n) the valve means includes a piston reciprocatively and sealingly mounted on the chamber, the piston having a member at one end movable with the piston and movable toward or away from the valve seat to control flow through the valve port, (o) the member includes the first pressure surface, (p) the piston includes the opposed second pressure surface partially defining the chamber, (q) the member being provided with a vent hole communicating the valve passage at the said one side of the valve port through the valve port with the chamber to subject the second pressure surface to the same pressure that is exerted on the first pressure surface, (r) an expansion means connected in the system between the condenser and evaporator, (s) the valve inlet being connected at the condenser inlet, (t) the valve outlet being connected at the evaporator inlet on the low pressure side of the expansion means to bypass high pressure gas from the condenser into the low pressure side, (u) the means interconnecting the said other side of the motor element and the system being connected to the system at the evaporator, and (v) the area of the first pressure surface being at least as large as the area of the valve port, so as to maintain minimum evaporator pressure regardless of variations of refrigerating load.

References Cited

UNITED STATES PATENTS

| 2,854,025 | 9/1958 | Terry | 137—505.18 XR |
| 3,173,649 | 3/1965 | Bryant | 137—505.18 XR |
| 3,194,499 | 7/1965 | Noakes | 137—505.18 XR |
| 3,282,288 | 11/1966 | Sheppard | 137—505.18 XR |

MEYER PERLIN, *Primary Examiner.*